United States Patent [19]

Tanaka

[11] 4,422,112

[45] Dec. 20, 1983

[54] MAGNETIC RECORDING AND REPRODUCING APPARATUS

[75] Inventor: Shigeo Tanaka, Kawasaki, Japan

[73] Assignee: Tokyo Shibaura Denki Kabushiki Kaisha, Kawasaki, Japan

[21] Appl. No.: 271,932

[22] Filed: Jun. 9, 1981

[30] Foreign Application Priority Data

Jun. 13, 1980 [JP] Japan .................................. 55-79794

[51] Int. Cl.³ ....................... G11B 21/24; G11B 21/08
[52] U.S. Cl. ........................................ 360/77; 360/75; 360/109
[58] Field of Search .................................. 360/77–78, 360/109, 106, 75, 7, 9, 12, 62

[56] References Cited

U.S. PATENT DOCUMENTS

| 2,907,008 | 9/1959 | Krieger | 360/7 |
| 3,100,297 | 8/1963 | Reines | 360/109 |
| 4,101,937 | 7/1978 | Jenkins | 360/109 |
| 4,158,868 | 6/1979 | Jenkins | 360/109 |
| 4,261,022 | 4/1981 | Marlowe | 360/90 |
| 4,270,153 | 5/1981 | Bejerano et al. | 360/78 |
| 4,333,116 | 6/1982 | Schoettle et al. | 360/109 |

Primary Examiner—Alfred H. Eddleman
Attorney, Agent, or Firm—Cushman, Darby & Cushman

[57] ABSTRACT

Disclosed is a video tape recorder, which uses an endless magnetic tape where recording tracks are formed in the running direction of the tape and in which magnetic heads are moved in the direction of the width of the tape with every excursion of the tape. The video tape recorder includes two magnetic heads such that while one of them is being used for recording, the other spaced apart from the first-mentioned one by an amount corresponding to several tracks can be used to trace the recording tracks formed by the first-mentioned head for reproduction, and thus it is possible to obtain a time shift of video signal.

15 Claims, 6 Drawing Figures

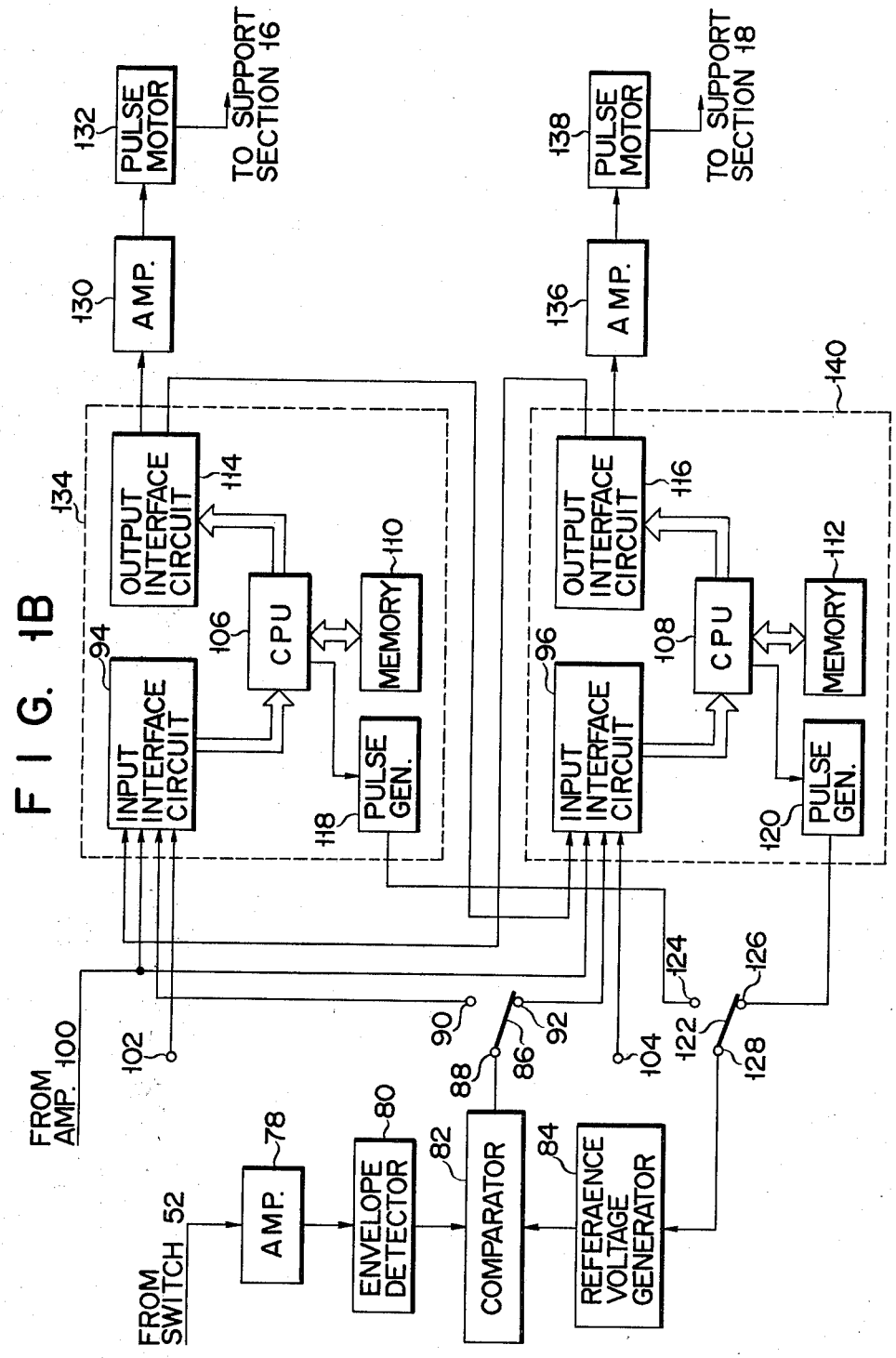
F I G. 1B

MAGNETIC RECORDING AND REPRODUCING APPARATUS

BACKGROUND AND SUMMARY OF THE PRESENT INVENTION

This invention relates to a magnetic recording and reproducing apparatus and, more particularly, to a magnetic recording and reproducing apparatus of stationary head type which records a signal and at the same time reproduces signal recorded a given time before, without interrupting the signal recording.

The video tape recorder (VTR) makes it possible to record any broadcast television program that cannot be watched while it is broadcasted and watch it at any desired later time, thus permitting effective use of time. However, with a recording of one-hour television program using the conventional VTR, it is necessary to record it by taping one hour and then rewinding the tape before starting the playback. In other words, in this case the playback of this recorded program can be started only after the lapse of one hour that is required for the recording and a certain period required for the rewinding. This is inconvenient in such case when the user, having left home by setting the VTR to record the one-hour program, returns home 30 minutes after the start of the recording. In such a case, it is possible only to watch the remaining portion of the program by interrupting the recording and subsequently watch the recorded portion of the program or continue the recording for the remaining 30 minutes and subsequently watch the entirely recorded program. In the latter case, the user has to wait for a considerable period of time until it is ready to start the playback.

While the rotary head system has been adopted for the conventional household VTR, it is difficult to provide two heads respectively for recording and playback due to a complex construction. Only high class 4 helical head system VTRs are presently available as the VTR having a monitor head for use in the broadcasting station. However, these VTRs are used only as monitors for preventing recording error. It is impossible to record a signal by one head and to reproduce the recorded signal at the same time.

An object of the invention is to provide a magnetic recording and reproducing apparatus, which has stationary magnetic heads, records a signal and at the same time reproduces the signal recorded a given time before, without interrupting the signal process recording.

This object of the invention is realized by a magnetic recording and reproducing apparatus comprising a plurality of magnetic heads for defining a plurality of tracks on a magnetic tape which extends in the running direction of the magnetic tape, on which a signal is recorded and from which a signal is reproduced, a head moving section for supporting the magnetic heads and moving at least one of the head in the width direction of the magnetic tape, thereby changing the distance between any two adjacent heads, and a drive section for driving the head moving section, thereby moving the magnetic heads in the width direction of the magnetic tape without changing the distance between any two adjacent magnetic heads.

BRIEF DESCRIPTION OF THE ACCOMPANYING DRAWINGS

This invention can be more fully understood from the following detailed description when taken in conjunction with the accompanying drawings, in which:

FIGS. 1A and 1B show a block circuit diagram of one embodiment of the magnetic recording and reproducing apparatus according to the invention;

DETAILED DESCRIPTION OF THE PREFERED EXEMPLARY EMBODIMENTS

Figure 1A:
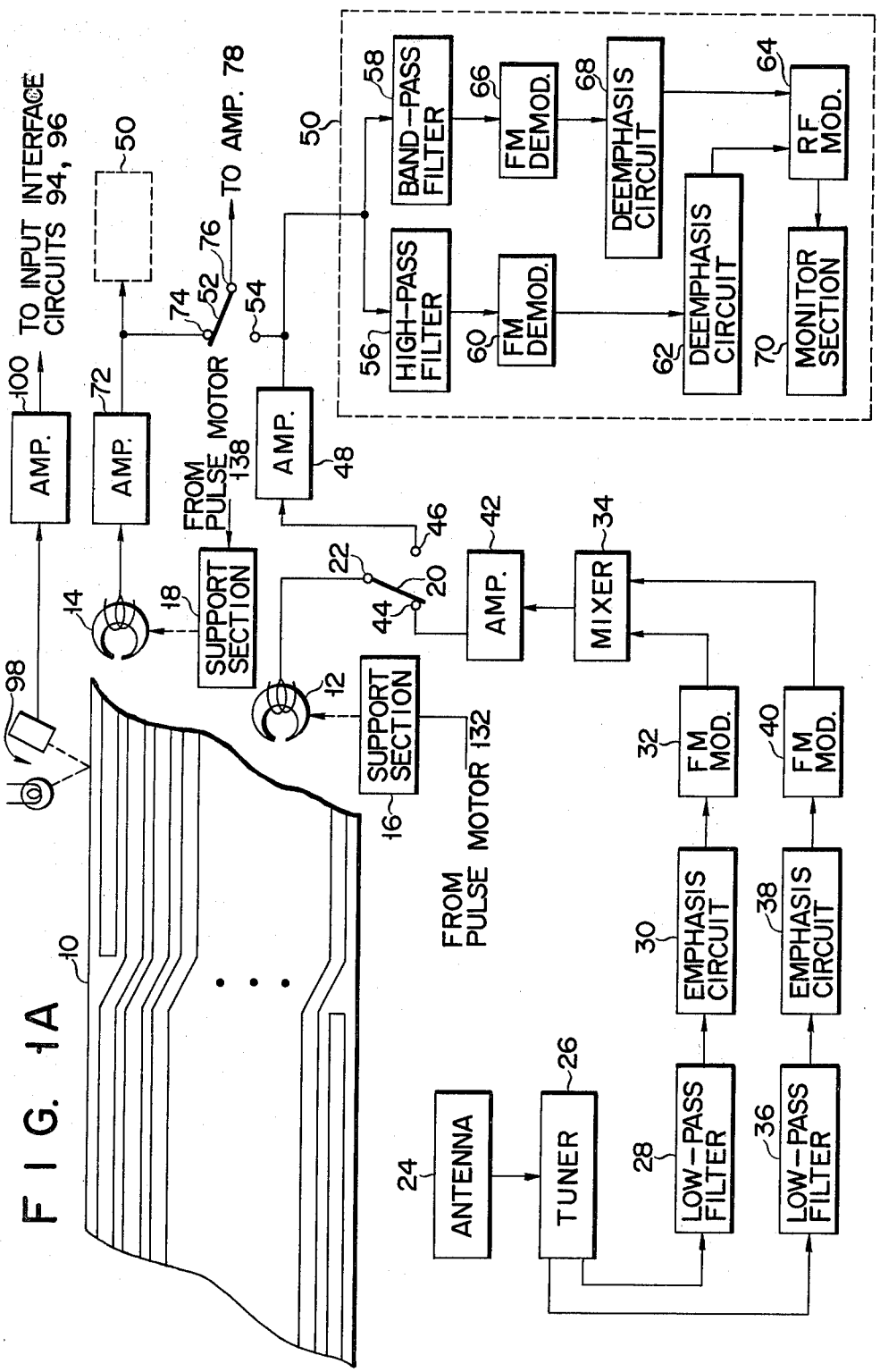
Figure 2A:
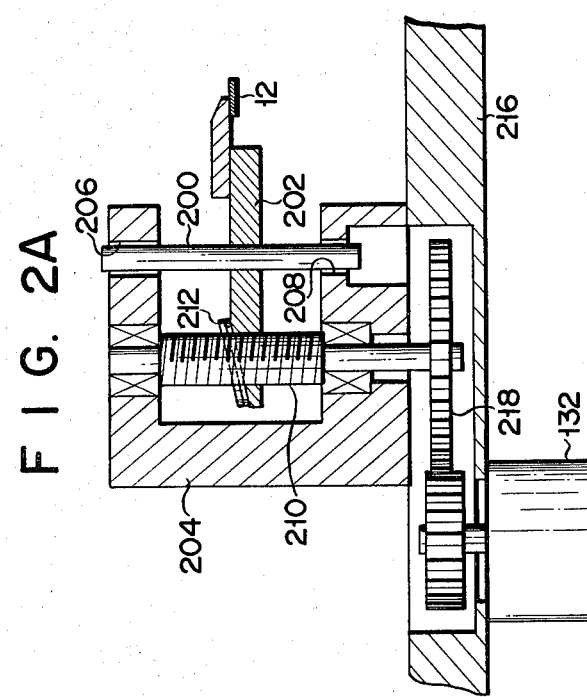
FIG. 2A is a sectional view showing the construction of a magnetic head support section used in the same embodiment depicted in FIGS. 1A and 1B.
Figure 2B:
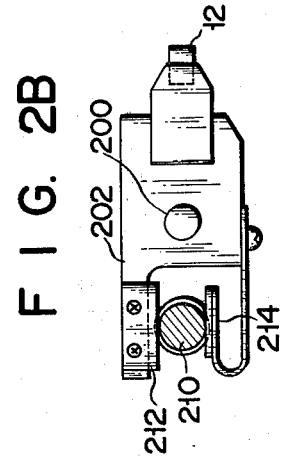
FIG. 2B is a plan view of the section shown in FIG. 2A.

Now, an embodiment of the magnetic recording and reproducing apparatus according to the invention will be described with reference to the accompanying drawings. The embodiment is applied to a two-head VTR which is used with an endless magnetic tape in which recording tracks are formed in its longitudinal direction. Referring to FIGS. 1A and 1B, two magnetic heads 12 and 14 are provided to trace respectively predetermined one of plurality of tracks formed on an endless tape 10 in the running direction thereof (i.e., longitudinal direction of the tape). The head 12 is an ordinary recording and reproducing head, and the head 14 is a reproducing head which is provided according to the invention. The heads 12 and 14 are supported by respective support sections 16 and 18 (FIGS. 2A and 2B).

The magnetic head 12 is connected to a movable contact 22 of a changeover switch 20. An antenna 24 is connected to a tuner 26, which produces both video and audio signals. For the sake of simplicity, it is assumed that the video signal is a B/W signal omitting a color signal. The video signal output of the tuner 26 is coupled through a low-pass filter 28, an emphasis circuit 30 and an FM modulator 32 to a first input terminal of a mixer 34. The audio signal output of the tuner 26 is coupled through a low-pass filter 36, an emphasis circuit 38 and an FM modulator 40 to a second input terminal of the mixer 34. The composite signal output of the mixer 34 is coupled through an amplifier 42 to a first fixed contact 44 of the switch 20, which has its second fixed contact 46 connected through an amplifier 48 to a reproducing signal processing circuit 50 and a first fixed contact 54 of a changeover switch 52. The video and audio signals supplied to the reproducing signal processing circuit 50 are coupled to a high-pass filter 56 and a band-pass filter 58, respectively. The output signal of the high-pass filter 56 is coupled through an FM demodulator 60 and a deemphasis circuit 62 to an RF modulator 64. The output signal of the band-pass filter 58 is coupled through an FM demodulator 66 and a deemphasis circuit 68 to the RF modulator 64. The output signal of the RF modulator 64 is coupled to a monitor section 70.

The output signal of the magnetic head 14 is coupled through an amplifier 72 to a second fixed contact 74 of the switch 52 and reproducing signal processing circuit 50. The switch 52 has its movable contact 76 connected through a band-pass amplifier 78 and an envelope detector 80 to a first input terminal of a comparator 82. The output terminal of a reference voltage generator 84 is connected to a second input terminal of the comparator 82, which has its output terminal connected to a movable contact 88 of a changeover switch 86. The switch 86 has its first and second movable contacts 90 and 92 connected to respective input interface circuits 94 and 96. The tracks formed in the tape 10 each extend parallel to the running direction of the tape except for a portion connected to the next track, which portion is inclined with respect to the tape running direction. The section of the tape 10 corresponding to the inclined track portions is provided with a tape end mark (not shown). For detecting this tape end mark, a tape end mark detector 98 is provided in the vicinity of the tape run, and its output terminal is connected through an amplifier 100 to the input interface circuits 94 and 96. Signal terminals 102 and 104 from which key operation signals provided in an interlocked relation to the operations of keys (not shown) are connected to the respective input interface circuits 94 and 96. The input interface circuits 94 and 96 are connected to respective central processing units (CPU) 106 and 108. The CPUs have respective memories 110 and 112, and their output signals are coupled to respective output interface circuits 114 and 116. The output signals of the CPUs 106 and 108 are also coupled to respective pulse generators 118 and 120, which have their output terminals respectively connected to first and second fixed contacts 124 and 126 of a changeover switch 122. The movable contact 128 of the switch 122 is connected to a control terminal of the reference voltage generator 84 which controls the output timing of the comparator 82. The comparator 82 acts as an A/D converter. The output interface circuit 114 is connected to the input interface circuit 96 and also connected through an amplifier 130 to a pulse motor 132. The shaft of the pulse motor 132 is connected to the support section 16. Here, the input interface circuit 94, CPU 106, memory 110, output interface circuit 114 and pulse generator 118 form an auto-tracking circuit 134 for the magnetic head 12. The output interface circuit 116 is connected to the input interface circuit 94 and also connected through an amplifier 136 to a pulse motor 138. The shaft of the pulse motor 138 is connected to the support section 18. The input interface circuit 96, CPU 108, memory 112, output interface circuit 116 and pulse generator 120 form an auto-tracking circuit 140 for the magnetic head 14.

Now, the construction of the support section 16 will be described with reference to FIGS. 2A and 2B. The construction of the support section 18 is the same as the support section 16, so its description is omitted. FIG. 2A is a sectional view, and FIG. 2B is a plan view. The magnetic head 12 is secured to one end of a support 202, which also carries a cylindrical guide rod 200 penetrating its central portion, and is adapted to be in contact with the tape. The upper and lower ends of the guide rod 200 extend through guide holes 206 and 208 respectively formed in upper and lower arms of a support frame 204 so that the support 202 is movable in the vertical directions. The tape 10 is disposed such that its width direction corresponds to the vertical directions in the FIGURE. The upper and lower arms of the support frame 204 rotatably support a threaded shaft 210 which extends parallel to the guide rod 200. The support 202 is provided at its other end with an inclined blade 212 which is in mesh with the threaded shaft 210. The blade 212 is urged against the threaded shaft 210 by a spring mechanism 214 provided on the support 202 of the side of the threaded shaft 212 opposite the blade 212. Thus, with the rotation of the threaded shaft 210 the support 202, i.e., magnetic head 12, can be moved in the vertical directions in the FIGURE under the guide of the guide rod 200 and guide holes 206 and 208. The lower arm of the support frame 204 is secured to a base plate 216. Beneath the base plate 216 the pulse motor 132 is provided, and its shaft is coupled through a reduction gear 218 to the lower end of the threaded shaft 210.

Figure 3:
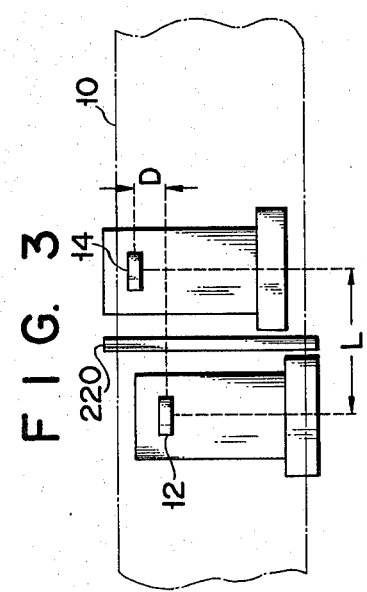
FIG. 3 is a view showing the positional relation of two magnetic heads.

FIG. 3 shows the magnetic heads 12 and 14 supported in the above manner and viewed from the side of the running surface of the tape 10. As is shown, both the heads 12 and 14 are spaced apart a center-to-center distance D in the width direction of the tape. In the tape running direction, they are spaced apart a center-to-center distance L, and a magnetic shield 220 is provided between them.

The operation of this embodiment will now be described. First, the case of making playback with the magnetic head 14 during the recording with the head 12 will be described. To this end, the switch 20 is set to the side of the first fixed contact 44, the switch 52 is set to the side of the second fixed contact 74, the switch 86 is set to the side of the second fixed contact 92, and the switch 122 is set to the side of the second fixed contact 126 (see FIGS. 1A and 1B). These four switches are ganged together, and they are all set to the opposite fixed contact side when both the heads 12 and 14 are used for the playback. On the tape 10 there are formed tracks successively arranged in the direction of tape width. The tuner selects a desired program from the television signals supplied to it from the antenna 24. The selected television signal is separated into the video and audio component signals, which are coupled through respective low-pass filters, emphasis circuits and FM modulators to the mixer 34 to be mixed there. The mixed signal is amplified by the amplifier 42 and recorded on the tape 10 via the head 12. When the tape end mark is detected by the detector 98 during the running of the tape 10, the detection signal from the detector 98 is coupled to the input interface circuit 94. As a result, the CPU 106 reads out a shift instruction signal from the memory 110 and supplies it through the output interface circuit 114 to the pulse motor 132. Consequently, the pulse motor 132 is rotated a predetermined rotational angle at a predetermined speed. Thus, with the rotation of the threaded shaft 210 the head 12 is shifted in the width direction of the tape to a position corresponding to the next track.

Assuming now that the magnetic head 14 is set at a position corresponding to the first track on the tape 10, if it is desired to start playback a predetermined period after the start of recording, a corresponding key is operated to supply a key operation signal from a signal terminal 104 to the input interface circuit 96. As a result, the CPU 108 causes the rotation of the pulse motor 138. Assuming that the endless tape completes one excursion in 30 seconds and 300 tracks are formed, the time difference in the operation of both the heads is set in units of 30 seconds. The signal from the head 14 is supplied to the reproducing signal processing circuit 50, and the video and audio signals are passed through the high-pass filter 56 and band-pass filter 58 respectively and then supplies after FM demodulation and frequency deemphasis to the RF modulator 64. The RF modulation signal is supplied to the monitor section 70 where the reproduced image is reproduced.

The signal from the head 14 is also coupled through the switch 52 to an envelope detector 80 and thence to the comparator 82. The reproduced signal is compared with the output of the reference voltage generator 84, and the H or L level signal according to the comparison is coupled through the switch 86 to the input interface circuit 96. The CPU 108 judges the amplitude of the output of the envelope detector 80 and sends an instruction signal representing the timing direction and amount of the rotation of the pulse motor 138 to the pulse motor 138 when the level of the output signal of the comparator 82 is inverted to the H level from the L level. When the head 14 deviates from the track, automatic correction of the deviation is made so as to maximize the output of the head. Since the distance D between the heads 12 and 14 is initially set, the magnetic head 12 also gets out of the track at this time. Thus, the CPU 108 also supplies a signal through the output interface circuit 116 and input interface circuit 94 to the CPU 106, which accordingly drives the pulse motor 132. Consequently, the distance D between both the heads 12 and 14 is held constant. When the tape end mark is detected by the detector 98, both the heads 12 and 14 are shifted to a position corresponding to the next track without changing the distance D between the heads relative to each other. The distance D between the heads 12 and 14 are fixed initially, but it is possible to change the distance D, if necessary.

It will be appreciated that with this embodiment the playback can be obtained from a desired instant during and after the start of the recording, so that it is possible to use time very effectively. The single magnetic head 14 can also be shifted manually by supplying key operation signal to the signal terminal 104. Thus, it is possible to skip undesired portions of the reproduction such as commercial advertisements. Then, it is possible to perfectly observe a two-hour television program in one hour and a half by starting the playback 30 minutes after the start of the program, which is very useful. In this case, the distance D varies during the reproduction. When using the two magnetic heads one as the recording head and the other as the reproducing head, it is likely that crosstalk is produced between the signals of these heads, because the signal level of the reproducing head is as low as, for instance, 1 mV whereas the signal level of the recording head is as high as about 1 V. This is prevented by the magnetic shield 220 provided between the heads as shown in FIG. 3. Alternatively, the distance L between both the heads in the direction of running of the tape may be set to be sufficiently large. In the above embodiment, by setting the switches to the opposite state to that mentioned earlier, both the heads can be used as reproducing head. In this case, the reproduced signal from the magnetic head 12 can be used as an auto-tracking signal. The other operation in this case is the same as described previously and is thus not described here. An example of the case of using both the heads as reproducing head is when separately reproducing different pieces of information individually recorded in the respective upper and lower halves of the tape, and this method of use is highly worthwhile mainly for educational purposes; for instance, in case when recording a teacher giving a lecture is recorded on the upper half of the tape, and the materials, graphs, etc. used in the lecture are recorded on the lower half.

Figure 4:
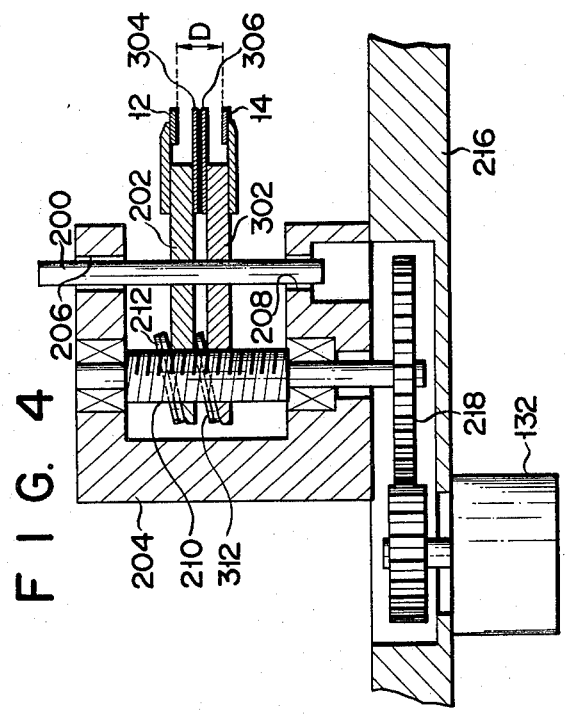
FIG. 4 is a sectional view showing a magnetic head support section used in a second embodiment of the invention.

Now, a second embodiment of the invention will be described. In this embodiment, two magnetic heads 12 and 14 are mounted in a single support section. The circuit of this embodiment is the same as that of the first embodiment shown in FIGS. 1A and 1B except for that the auto-tracking circuit 140, amplifier 136, pulse motor 138 and switches 86 and 122 are omitted, so that it will not be described here. In FIG. 4, like parts with respect to FIG. 2A are designated by like reference numerals. Here, two supports 202 and 302 are coupled to a single threaded shaft 210 by respective blades 212 and 312. Shields 304 and 306 are provided on the lower side of the support 202 and the upper side of the support 302 respectively. In this embodiment, the distance D between both the heads may be adjusted by vertically moving the supports with external forces by loosening the blades. With one rotation of the threaded shaft the heads are shifted by an amount corresponding to just an integral number of tracks (for instance 14 tracks), so that deviation of the heads from the track will not result from shifting them by several threads. The recording, reproducing and tracking operations of this embodiment are the same as in the first embodiment and are not described here. This embodiment has advantages that the distance D between both the heads will not be changed once it is set and that the construction is simpler.

While the above embodiments have concerned with the endless tape, this is by no means limitative, and the invention may also be applied to the ordinary reciprocal tape where a plurality of tracks are formed to extend in its running direction. Further, instead of two heads, any desired number of heads may be provided for simultaneously tracking a plurality of tracks.

What is claimed is:

1. A magnetic recording and reproducing apparatus comprising:
   a recording head for recording a signal on a recording medium on which a plurality of tracks are provided along the direction in which the recording head and the recording medium are relatively moved;
   a reproducing head for reproducing a signal;
   support means for supporting said recording head and said reproducing head to establish a predetermined separation distance therebetween;
   head moving means for moving at least one of said recording head and said reproducing head in a direction perpendicular to the track to change said separation distance therebetween; and
   drive means operatively connected to said support means for driving said support means in a direction perpendicular to said tracks while maintaining said separation distance between said recording head and said reproducing head.

2. An apparatus according to claim 1, in which said recording medium is an endless magnetic tape.

3. An apparatus according to claim 2, wherein said head moving means includes a support plate means for supporting said recording head and reproducing head, a gear mechanism, and a threaded shaft rotatable by said gear mechanism to move said support plate means in the width direction of the magnetic tape.

4. An apparatus according to claim 3, wherein said head moving means further includes at least one magnetic shield plate disposed between said recording head and reproducing head.

5. An apparatus according to claim 2, wherein said drive means includes a tracking detector means for generating a tracking signal as said reproducing head tracks the magnetic tape and a drive circuit means for generating, in response to the tracking signal, a drive signal for driving said head moving means.

6. A magnetic recording and reproducing apparatus comprising:
- a recording head for recording a signal on a recording medium on which a plurality of tracks are provided along the direction in which the recording head and the recording medium are relative moved;
- a reproducing head for reproducing a signal;
- means for supporting said recording head and said reproducing head to establish a predetermined separation distance therebetween;
- means for moving at least one of said recording head and said reproducing head in a direction perpendicular to the track to change said separation distance therebetween;
- means connected to said supporting head for driving said supporting means in a direction perpendicular to said tracks while maintaining said separation distance between said recording head and said reproducing head; and
- electric circuit means operatively connected to said recording and reproducing heads for supplying a frequency modulated signal to said recording head and for receiving a frequency modulated signal from said reproducing head.

7. An apparatus according to claim 6, in which said recording medium is an endless magnetic tape.

8. An apparatus according to claim 7, wherein said head moving means includes a support plate means for supporting said magnetic head, a gear mechanism, and threaded shaft rotatable by said gear mechanism to move said support plate in the width direction of the magnetic tape.

9. An apparatus according to claim 8, wherein said head moving means further includes at least one magnetic shield plate disposed between said recording head and said reproducing head.

10. An apparatus according to claim 7, wherein said drive means includes a tracking detector means for generating a tracking signal as said reproducing head tracks the magnetic tape and a drive circuit means for generating, in response to the tracking signal, a drive signal for driving said head moving means.

11. An apparatus according to claim 10, wherein said drive means further includes a reference signal generator and comparator, said detector generating a tracking signal in response to the comparison result of the reference signal and signal from said reproducing head.

12. An apparatus permitting the recording of information signals on a recording medium of the type having plural separated information tracks while simultaneously permitting reproduction of previously recorded information signals, said apparatus comprising:
- recording head means for recording first information signals on a first one of said plural tracks and thereafter recording second information signals on successive predetermined ones of said plural tracks;
- reproducing head means for reproducing said first information signals recorded on said first one of said plural tracks after all said first information signals are recorded thereon and thereafter successively reproducing said second information signals previously recorded on said successive predetermined ones of said plural tracks, said recording and reproducing of said information signals being accomplished according to a preselected time interval such that while said second information signals are being recorded on said successive tracks by said recording head means, said first information signals on said first one track are capable of being reproduced by said reproduction head means; and
- mounting and moving means operatively connected to said recording and reproducing head means for (a) mounting said recording and reproducing head means to establish a predetermined separation dimension therebetween, (b) selectively moving said recording or reproducing head means relative said plural tracks to permit recording of said information signal by said recording head means while simultaneously permitting reproduction of previously recorded information signals by said reproduction head means, and (c) selectively moving said recording head means and reproducing head means relative to one another to selectively change said separation dimension therebetween and thus establish said predetermined time interval.

13. An apparatus as in claim 12 further comprising tracking detector means operatively connected to said mounting and moving means for generating a tracking signal for said recording and reproducing head means as they operatively follow said plural tracks and for generating a drive signal in response to said tracking signal for moving said recording or reproducing head means relative to said tracks to prevent deviation of said recording or reproducing head means during operation.

14. An apparatus as in claim 12 further comprising magnetic shield means disposed between said recording and reproducing head means for preventing signal crosstalk.

15. An apparatus for simultaneously recording and reproducing information on a recording medium of the type having plural separated tracks, said apparatus comprising:
- recording head means for recording information including first positioning means for positioning said recording head means relative to a predetermined first one of said plural tracks and thereafter recording information on successive ones of said plural tracks by determining when said first one of said plural tracks has information completely recorded thereon and then successively recording further information on the successive ones of said plural tracks until all desired information has been recorded on said recording medium;
- reproducing head means for reproducing said information including second positioning means for positioning said reproducing head means relative to said first one of said plural tracks at a time subsequent to information being completely recorded thereon by said recording head means and thereafter reproducing said further information by determining the end of said first one of said plural tracks and then successively moving said reproducing head means relative to said successive ones of said plural tracks to reproduce said further information previously recorded thereon by said recorded head means, whereby
- simultaneous recording of information on said recording medium and reproduction of previously recorded information thereon is accomplished by virtue of the time interval established between the recording of information on any selected track of said recording medium and the reproduction of said information previously recorded on said selected track.

* * * * *